United States Patent
Momayezi

(10) Patent No.: US 9,851,457 B2
(45) Date of Patent: Dec. 26, 2017

(54) COMPENSATING FOR PULSE SHAPE VARIATION OF LIGHT IN SCINTILLATORS

(71) Applicant: BridgePort Instruments, LLC, Austin, TX (US)

(72) Inventor: Michael Momayezi, Austin, TX (US)

(73) Assignee: Bridgeport Instruments, LLC, Austin, TX (US)

(*) Notice: Subject to any disclaimer, the term of this patent is extended or adjusted under 35 U.S.C. 154(b) by 0 days.

(21) Appl. No.: 15/121,641

(22) PCT Filed: Sep. 1, 2015

(86) PCT No.: PCT/US2015/047935
§ 371 (c)(1),
(2) Date: Aug. 25, 2016

(87) PCT Pub. No.: WO2016/036736
PCT Pub. Date: Mar. 10, 2016

(65) Prior Publication Data
US 2017/0168170 A1    Jun. 15, 2017

Related U.S. Application Data

(60) Provisional application No. 62/044,576, filed on Sep. 2, 2014.

(51) Int. Cl.
*G01T 1/36*    (2006.01)
*G01T 1/208*   (2006.01)
*G01T 1/20*    (2006.01)

(52) U.S. Cl.
CPC .......... *G01T 1/362* (2013.01); *G01T 1/2008* (2013.01); *G01T 1/208* (2013.01)

(58) Field of Classification Search
CPC .. G01T 1/171; G01T 1/17; G01T 1/10; G01T 1/208; G01T 1/2008; G01T 1/247; G01T 1/249
See application file for complete search history.

(56) References Cited

U.S. PATENT DOCUMENTS

| | | | | |
|---|---|---|---|---|
| 4,058,728 A | * | 11/1977 | Nickles | G01T 1/1647 250/363.07 |
| 4,369,495 A | * | 1/1983 | Inbar | G01T 1/1642 128/922 |
| 4,968,889 A | * | 11/1990 | Hartwell | G01T 1/36 250/336.1 |
| 2003/0213913 A1 | | 11/2003 | Moyers et al. | |
| 2004/0036025 A1 | | 2/2004 | Wong et al. | |
| 2011/0095173 A1 | | 4/2011 | Menge et al. | |
| 2011/0144945 A1 | * | 6/2011 | Hayashi | G01T 1/17 702/183 |
| 2013/0009047 A1 | | 1/2013 | Grazioso et al. | |

FOREIGN PATENT DOCUMENTS

EP    2146226 A1    1/2010

* cited by examiner

*Primary Examiner* — David Porta
*Assistant Examiner* — Djura Malevic
(74) *Attorney, Agent, or Firm* — Michael A Ervin; M.A. Ervin & Associates

(57) ABSTRACT

A method and apparatus to improve the measurement accuracy for ionizing radiation pulses when using large scintillator crystals that absorb their own scintillation light.

16 Claims, 4 Drawing Sheets

COMPENSATING FOR PULSE SHAPE VARIATION OF LIGHT IN SCINTILLATORS

CROSS REFERENCE TO RELATED APPLICATIONS

This application claims the benefit of U.S. application Ser. No. 62/044,576 filed Sep. 2, 2014.

BACKGROUND

Radiation detection devices are used in a variety of industrial, scientific, military, and government applications. Exemplary scintillator detectors have scintillator crystals made of activated sodium iodide or cesium iodide, or other materials that are effective for detecting gamma rays.

Generally, the scintillator crystals are enclosed in casings or sleeves that include a window to permit radiation-induced scintillation light to pass out of the crystal package. The light passes to a light-sensing device such as a photomultiplier tube (PMT), and the photomultiplier tube converts the light photons emitted from the crystal into electrical pulses. The electrical pulses are shaped and digitized by associated electronics and may be registered as counts that are transmitted to analyzing equipment.

Scintillators are used for nuclear and X-ray radiation detection. In response to a pulse of ionizing radiation they create a light flash. That light flash is recorded and analyzed by suitable instrumentation. Modern instrumentation relies on these light flashes having a consistent pulse shape. Variable pulse shape reduces the instrument performance. Usually the energy of the ionizing radiation pulse is proportional to the sum total of the emitted scintillation light (its time integral). Some scintillators show strong self-absorption coupled with delayed emission. In that case, the proportionality breaks down. The effect increases with scintillator size. Bigger crystals are desirable as they measure and count ionizing radiation more efficiently. But the precision of the measurement degrades for bigger crystals.

Existing instruments convert the light pulse into a concomitant electronic pulse. Analog instruments will transform the electronic pulse to create a new pulse shape with a pulse-height that is proportional to the integral over the original pulse. Digital instruments will attempt to perform a direct integration of the electronic pulse without applying that transformation.

The performance of both types of instruments degrades when a scintillator shows strong self-absorption of its own scintillation light coupled with delayed re-emission.

Some scintillators shows strong self-absorption of their own scintillation light. In scintillators with delayed re-emission of the absorbed light, the pulse shape of the observed light pulse will depend on where in the crystal the radiation was absorbed.

Traditional analog or digital MCA's (multichannel analyzers) measure deposited energies using a fixed shaping time (analog MCA) or a fixed integration time (digital MCA). Both devices rely on the pulse shape being constant, except for statistical electronic noise fluctuations around the average pulse shape. If the pulse shape becomes position dependent, traditional MCAs will not measure energies as accurately as possible.

Some scintillation crystals and fluids exhibit a phenomenon where the light pulse shape depends on the type of absorbed radiation. The same can be achieved using composites of different scintillators packaged together (phoswich). This is often used to distinguish gamma-ray detections from neutron detection within the same scintillator. This disclosure anticipates at least scintillator detectors utilizing a phoswich from the class of a combination of ZnS(Ag) and a plastic scintillator, a combination of NaI(Tl) and CsI(Tl), a combination of NaI(Tl) and a plastic scintillator.

Distinguishing types of radiation by the pulse shape of the scintillation light is called pulse shape discrimination. Existing methods for pulse shape discrimination are crude. They may cut the light pulse into two or three segments and compare the integrals within each segment to decide on the radiation type. Using abrupt segment boundaries is suboptimal at best, and will fail for scintillators with significant self-absorption of their own scintillation light.

Recently developed scintillators combine pulse shape discrimination capability with the ability to accurately measure gamma-ray (or beta-ray) energies. In these materials, the method used to measure the deposited energy must adapt to the type of radiation detected. Since pulse shapes are different for each type of radiation (gamma-ray, beta-ray, neutron, alpha-particle, etc.) a different method is required for each type of radiation to yield the most accurate measure of the deposited energy in each case.

There is a need to make the unique capabilities of new scintillator materials accessible to mainstream applications for improved radiation detection, monitoring and measurement. For instance, a high-resolution gamma-ray detector based on SrI2(Eu) can separate Cs-137 radiation (at 662 keV) from naturally occurring Bi-214 (at 609 keV). This strongly enhances the minimum detectable activity in food, water or soil samples, for the usually man-made fission product Cs-137.

Advanced digital signal processing, as described here, can improve the accuracy of gamma-ray spectroscopy in scintillators with strong self-absorption of their own scintillation light followed by delayed re-emission.

It can improve the accuracy of measuring deposited energies by different types of radiation when the energy computation is tailored for each type of radiation.

This supports using larger, self-absorbing scintillator crystals than would ordinarily be possible.

SUMMARY

The need is addressed by a new measurement method that overcomes the limitations of applying an electronic transformation or straight digital integration. This method examines the details of the electronic pulse as it develops and gives greater importance to some parts of the pulse than to others.

The method creates a digitally shaped pulse that is then integrated. As a result the precision of the ionizing pulse measurement is significantly enhanced. This supports using larger self-absorbing scintillator crystals than would otherwise be possible.

The need can be met by a method for compensating for pulse shape variation of light generated by scintillator detectors including at least: receiving ionizing radiation pulses into a scintillator utilizing activated crystals that generate analog light pulses; converting the generated light pulses into analog electrical pulses; converting the analog electrical pulses into digital pulses; and processing the digital pulses to provide a measure of the energy (E) received in the scintillator.

The need can be further met by the method wherein the step of processing the digital electrical pulses to provide a measure of the energy E received in the scintillator is computed from a sum of values y_e[n]=(y[n]−y_dc)*w[n] where y[n] is n'th ADC sample received after the arrival of a pulse, y_dc is a direct current baseline in the absence of a pulse, and w [n] is a supplied set of weighting coefficients.

The need can also be met by an apparatus for compensating for pulse shape variation of light generated by scintillator detectors including at least: a scintillator for receiving radiation pulses and generating light pulses; a light-to-electric pulse converter to convert the light pulses to analog electrical pulses; an optional amplifier to amplify the analog electrical pulses; an analog to digital converter to convert the analog electrical pulses to digital pulses; a pulse-processing unit to measure the energy of incoming digital pulses; a computational unit for managing the pulse processing unit and gathering information from the pulse processing unit.

In another embodiment this disclosure anticipates at least scintillator detectors utilizing a phoswich from the class of a combination of ZnS(Ag) and a plastic scintillator, a combination of NaI(Tl) and CsI(Tl), a combination of NaI (Tl) and a plastic scintillator.

In another embodiment this application anticipates using as scintillators europium-doped alkaline earth halides, such as SrI2(Eu), BaI2(Eu) or mixtures thereof. In addition plastic scintillator containing 2,5-diphenyl oxazole (PPO) as the primary scintillating materials and diphenyl anthracene (DPA) as the wavelength shifter to match the emission light wavelengths to the photomultiplier tube sensitivity. In addition using as scintillators elpasolite crystals including Cs LiLaBr:Ce (CLLB) 2LiLaBr6:Ce (CLLB), Cs2LiYCl6:Ce (CLYC), Cs2LiLaCl6:Ce (CLLC).

DETAILED DESCRIPTION

This need can be met with a digital multichannel analyzer (MCA) used in conjunction with a scintillator that absorbs its own radiation light, the MCA including at least analog to digital circuitry that converts a momentary electronic pulse amplitude from the scintillator into a digital number, a pulse processing unit for performing computations on a sequence of such iii digital numbers, a memory device for storing a sequence of the digital numbers (weights), or a means to compute the weights when needed, wherein the method used by the MCA is described below.

Figure 1:
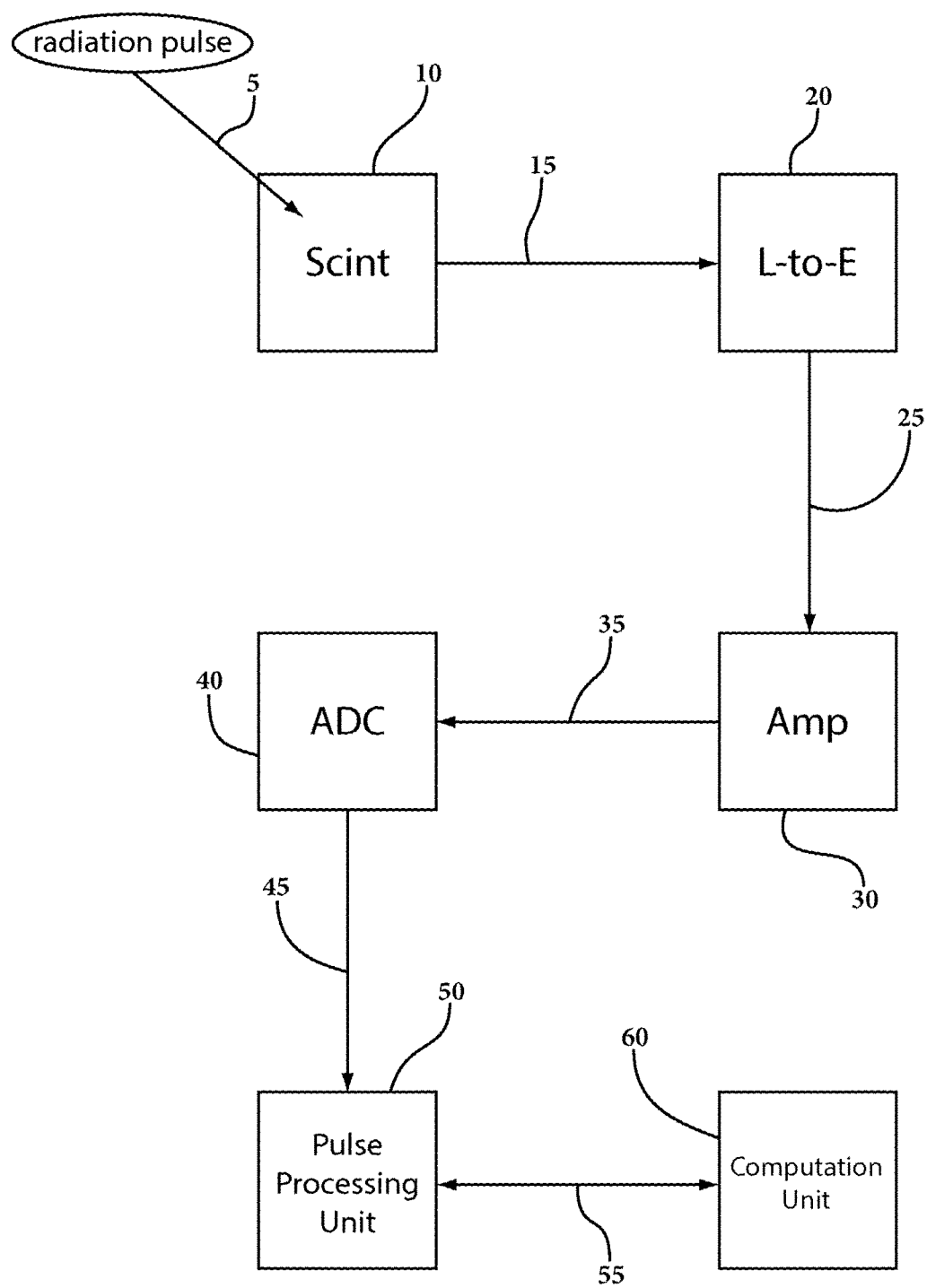
FIG. 1 illustrates an apparatus that could be used to carry out the method of this disclosure.

The device is illustrated in FIG. 1, beginning with a scintillator 10. This disclosure anticipates a number of different scintillator crystals that can be used, including at least activated sodium iodide or cesium iodide, or other materials that are effective for detecting gamma rays. Also anticipated are europium-doped alkaline earth halide, such as SrI2(Eu), BaI2(Eu) or mixtures thereof. In addition plastic scintillator containing 2,5-diphenyl oxazole (PPO) as the primary scintillating materials and diphenyl anthracene (DPA) as the wavelength shifter to match the emission light wavelengths to the photomultiplier tube sensitivity.

Scintillator 10 may receive a radiation pulse 5. The radiation pulse may be energetic photons >10 eV, atomic or nuclear particles such as electrons, positrons, protons, neutrons, alpha-particles, or others. When the scintillator crystal receives a radiation pulse it creates a light pulse 15 that passes to a light-to-electrical pulse converter 20. This may be a photomultiplier, an avalanche photodiode, or a photodiode. Device 20 then creates an electrical pulse 25 that substantially has the same amplitude vs time characteristic (pulse shape) as the original light pulse. Electrical pulse 25 passes to an electronic amplifier 30 that amplifies electrical pulse 25 and substantially preserves the electronic pulse shape in creating an amplified electronic pulse 35. In some embodiments the amplifier 30 may be omitted. Pulse 35 passes to an analog to digital converter 40 that converts the signal to a digital signal 45 that substantially preserves the electronic pulse shape. A pulse processing unit 50 applies methods to recognize incoming pulses and measures their energy taking account of their pulse shape. A computational unit 60, that may be a computer, microcontroller field programmable gate array or an application-specific integrated circuit (ASIC) issues commands and exchanges data with the pulse processing unit 50 to retrieve pulse energy and pulse type information.

For each ionizing-radiation pulse, the MCA receives an electronic pulse proportional, or nearly proportional, to the momentary light output from the scintillator. The electronic pulse is amplified as needed and presented to the analog to digital circuitry. This creates a digital image of the electronic pulse and therefore of the momentary scintillation light pulse.

A pulse-processing unit monitors the output from the analog to digital circuitry. In the absence of a pulse, it measures the direct current (DC) baseline (y_dc). The DC-baseline is always subtracted from the analog to digital circuitry samples (y[n]) to create the y-samples (y_e[n]). When a pulse is recognized by the trigger logic, a digital shaper within the pulse-processing unit is activated. The digital shaper includes a method to make available a sequence of weights (w [n]). The method may involve a computation, based on the index n and controlling parameters, or be a simple look-up table implemented in local memory. On trigger, the digital shaper performs the computation:

$$y\_e[n]=(y[n]-y\_dc)*w[n]$$

where n is the sample count since the last trigger. A predetermined number N of y_e samples are summed to provide a measure of the energy (E) deposited in the scintillator. The digital shaper performs many of these computations in a parallel manner.

The sum serves as a measurement of the original ionizing pulse energy.

A judicious choice of the weighting coefficients, w, significantly improves the accuracy of the radiation pulse measurement, compared to prior art.

The choice of weighting coefficients is predetermined experimentally, for example from a set of prerecorded pulse shapes. In practice, the weighting coefficients may be parameterized to allow the pulse-processing unit to compute the weighting coefficients as a function of temperature. In practice the pulse processing can utilize executable code written in in C/C++, Verilog, VHDL or other suitable languages.

The MCA delivers event data (sums of y_e samples). A plurality of event data can be graphically represented in a category plot, often called a histogram. It depicts the frequency at which the energies (E) of measured events fall into given ranges, called bins. In a typical histogram the bins have a width (dE) and the condition for an event to fall into the n'th bin is expressed as:

$$n*dE<=E<(n+1)*dE.$$

The content of a bin is a number. At the beginning of a histogram data acquisition the content of all bins is set to zero. During data acquisition, whenever an event's energy falls into a certain bin, that bin's content is incremented by 1. Over time a histogram builds up.

The performance of a radiation detection system is judged by the contents of the histogram after some acquisition time. In the case of measuring radiation from the nuclear isotope Cs-137 there will be a complex histogram.

The highest energy peak, a bell-shaped curve, will correspond to a gamma-ray energy of approximately 662 keV. Its full width at half-maximum height is an indicator of scintillator performance. The smaller the width, the better the performance.

Figure 2:
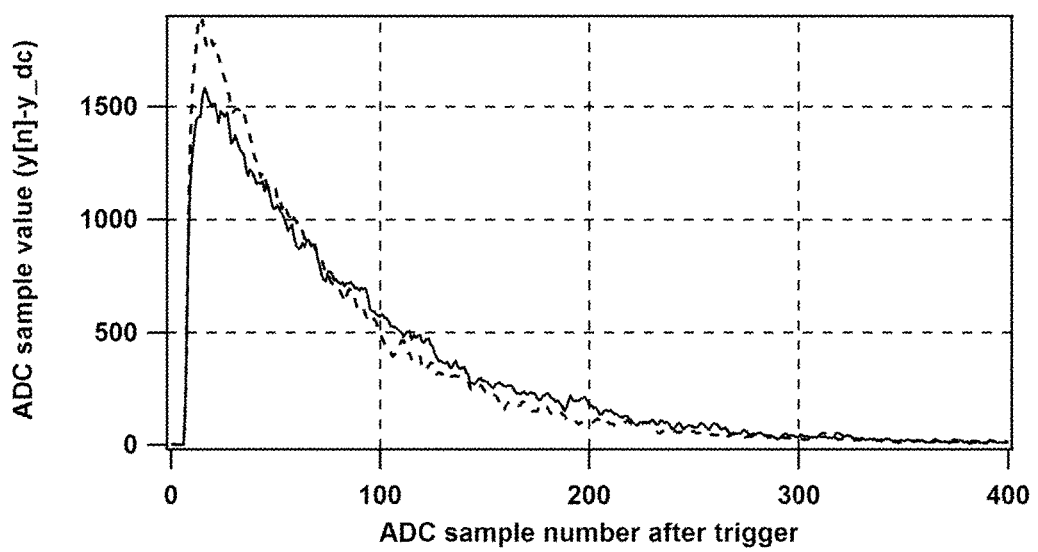
FIG. 2 illustrates scintillator pulses as converted by the ADC and with the DC-offset (y_dc) subtracted.

Turning to FIG. 2, the graph shows scintillator pulses as converted by the ADC and with the DC-offset (y_dc) subtracted. Shown is the sequence y[n]-y_dc, where n is the sample number after the trigger. The graph shows two pulses with different shapes, which nevertheless are attributed to the same deposited energy (662 keV in this case). Traditional methods, analog or digital, fail to accurately measure deposited energies in the face of such pulse shape variations.

Figure 3:
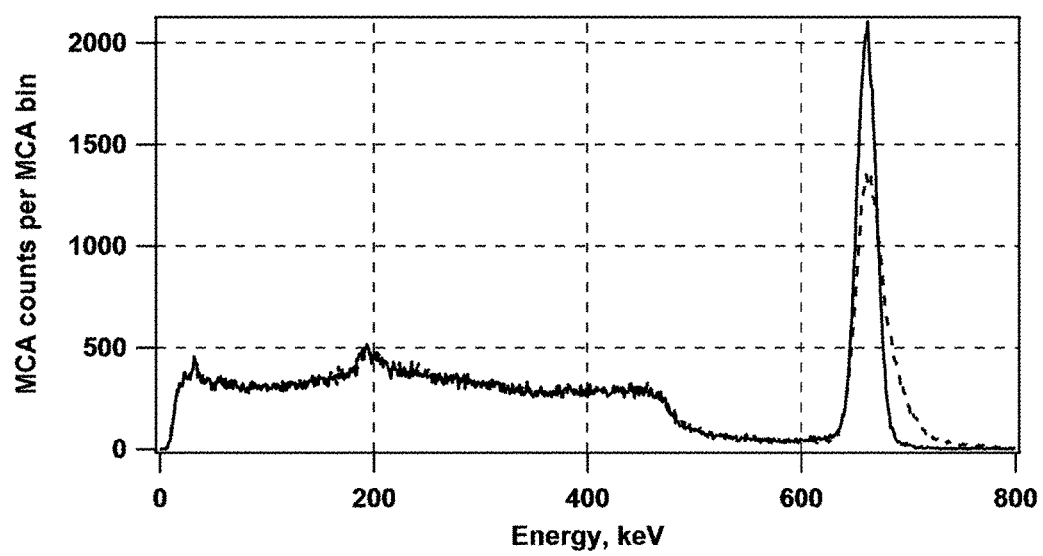
FIG. 3 illustrates two energy spectra acquired on the same detector when measuring a Cs-137 radioactive source.

Now turning to FIG. 3, the graph shows two energy spectra acquired on the same detector when measuring a Cs-137 radioactive source. The desirable spectral shape is shown with a solid line. The full-energy peak, centered around 662 keV, is narrow and highly symmetric. It was achieved using a method described in this application. The undesirable spectral shape is shown with a dashed line. The peak is broader, and most importantly it is asymmetric with a strong high-energy tail. It is the result of using constant weights. An MCA based on analog electronics using the traditional combination of charge-integrating preamplifier followed by a shaping amplifier would suffer the same problem. Depending on the chosen integration or shaping times, the full energy peak may exhibit high-energy or low-energy tailing.

Figure 4:
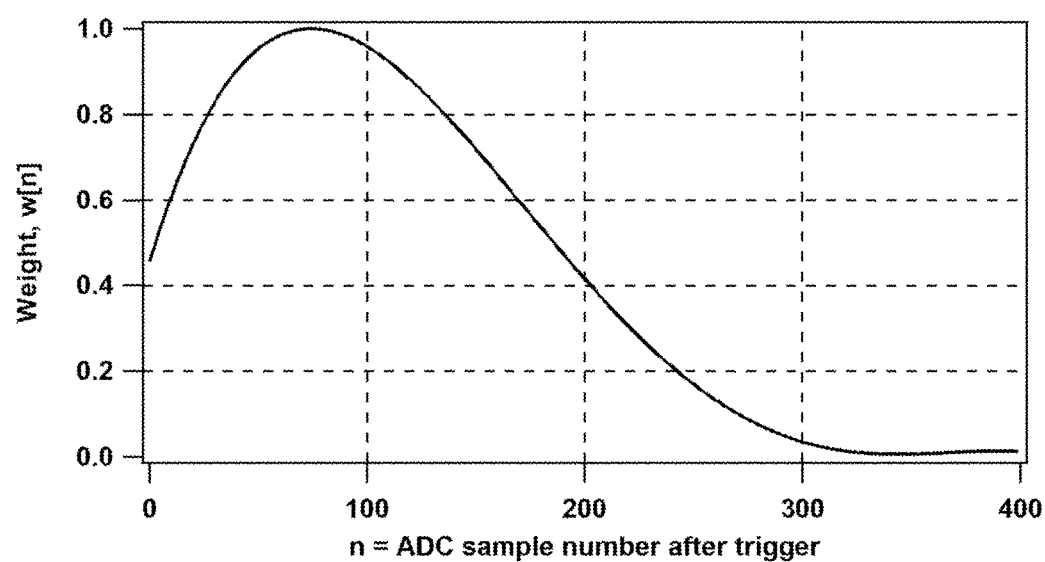
FIG. 4 illustrates a representative weights function.

Referring now to FIG. 4, the graph shows a representative weights function. In this example it covers an integration time of 400 ADC samples and has been normalized to have a maximum value of 1.0. Note how the weights function emphasizes the portion of the scintillator pulses where the two pulses from FIG. 2 coincide. It puts less weight on the portions where the two pulses disagree. In practice, for the purpose of accurately measuring energies, the weights function is a balance between the need to reduce sensitivity to pulse shape variation and to use as much information as possible from the pulse.

Pulse Shape Discrimination:

Some scintillators respond with different pulse shapes to different types of radiation such as gamma-rays, alpha-particles, protons and neutrons.

In this case it is necessary to determine the radiation type to accurately measure the amount of energy deposited in the scintillator.

The digital shaper may perform a computation to identify the type of radiation that caused the light pulse:

$$y\_g[n]=(y[n]-y\_dc)*g[n]$$

Let E be the event energy computed by summing the first N values of y_e[n] after a trigger. Let G be the numerical value computed by summing the first N values of y_g[n] after a trigger. The sequence g[n] will be chosen such that a comparison of E>G or E<G, when true, will indicate that the energy was deposited in the scintillator by a gamma ray.

This method can be extended to cover a second type of radiation, using a separate set of weights. For instance, thermal neutron absorption in the scintillator may be discovered using a sequence of weights t[n] to compute $$y\_t[n]=(y[n]-y\_dc)*t[n]$$

The digital shaper will sum the y_t[n] to yield the numerical value T and then perform the comparison E>T or E<T as appropriate. When the comparison evaluates to true, the energy deposit would be identified as having been caused by a thermal neutron.

This method can also be extended to cover even more types of incident radiation by choosing appropriate sets of weighting coefficients.

Due to unpredictable noise and fluctuations of the scintillator light pulse shapes, the different comparisons may yield conflicting results. For instance, a pulse may be classified as both, gamma-ray and thermal neutron, by the simple comparisons cited above. In this case, application software may be used to either discard ambiguous events or use additional information to make the decision.

In an additional embodiment, the digital MCA measures energies of gamma-rays emitted by radioactive atomic nuclei more accurately since it becomes insensitive to pulse shape variations of the scintillation light.

In an additional embodiment, the digital MCA measures energies of gamma-rays emitted by radioactive atomic nuclei.

In another embodiment, the digital MCA measures energies deposited by fast neutrons interacting with the scintillator material.

In another embodiment, the digital MCA determines that the detected radiation was a thermal neutron absorbed in the scintillator.

In another embodiment, the digital MCA determines that the detected radiation was a gamma-ray absorbed in the scintillator.

In another embodiment, the digital MCA determines that the detected radiation was a beta-ray absorbed in the scintillator.

In another embodiment, the digital MCA determines that the detected radiation was an alpha-particle absorbed in the scintillator.

Method Summary

Thus the method for improving the measurement accuracy for ionizing radiation pulses when using a scintillator that absorbs its own radiation light can be summarized as follows. This method includes at least providing memory to store a plurality of weights (w), or a means to compute said weights when needed, and a predetermined number of samples N. Then collecting a sequence of numbers representing the ionizing radiation light pulses (y[n]), and receiving a trigger signal that initiates a computation. The trigger signal may be received from an external device or be generated internally through computation. A computation of the sequence:

$$y\_e[n]=(y[n]-y\_dc)*w[n]$$

is then performed wherein n is the y-sample index since receiving the trigger signal. The method then sums N of the y_e samples.

The selected choice of the sequence w and the number N significantly improves the measurement accuracy for ionizing radiation pulses in scintillators that absorb their own radiation light.

In another embodiment the scintillator crystal is a Strontium Iodide (SrI2) crystal, and In another embodiment the scintillator crystal is larger than 13 cubic centimeters.

The method can also be used to distinguish types of radiation from each other. To identify one type of radiation, one can create a sequence with its own set of weights (g[n]).

$$y\_g[n]=(y[n]-y\_dc)*g[n]$$

The first N values of y_g[n] after a trigger are summed, yielding a number G. Depending on the type of scintillator, a comparison of E>G or E<G can be used to decide if the scintillator pulse was caused by a gamma-ray or not. Using sets of weights appropriate for the scintillator and radiation type, the method can be used to identify multiple types of radiation in one scintillator.

Improvement Results

It has been found that with SrI2 scintillators, the method can improve the measurement of energy of 662 keV gamma-rays from Cs-137 to an accuracy of better than 3.2% FWHM (Full Width at Half Maximum).

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

What is claimed is:

1. A method for compensating for pulse shape variation of light generated by scintillator detectors comprising:
   a. receiving ionizing radiation pulses into a scintillator utilizing activated crystals that generate analog light pulses;
   b. converting the generated light pulses into analog electrical pulses;
   c. converting the analog electrical pulses into digital pulses; and
   d. processing the digital pulses to provide a measure of the energy y_e[n] received in the scintillator;
   e. wherein the step of processing the digital electrical pulses to provide a measure of the energy E received in the scintillator is computed from a predetermined number of y_e[n] values where y_e[n]=(y[n]−y_dc)*w[n], y_dc is a direct current baseline in the absence of a pulse, and w [n] is a supplied set of weighting coefficients.

2. An apparatus for compensating for pulse shape variation of light generated by scintillator detectors comprising:
   a. a scintillator for receiving radiation pulses and generating light pulses;
   b. a light to electric pulse converter to convert the light pulses to analog electrical pulses;
   c. an analog to digital converter to convert the analog electrical pulses to digital pulses;
   d. a pulse-processing unit to measure the energy of incoming digital pulses;
   e. a computational unit for managing the pulse processing unit and gathering information from the pulse processing unit;
   f. wherein the pulse processing unit implements the method of claim 1.

3. The apparatus for compensating for pulse shape variation of light generated by scintillator detectors of claim 2 wherein the implementation of the method is in executable code selected from the group consisting of C/C++, Verilog, VHDL or other hardware description languages.

4. The apparatus for compensating for pulse shape variation of light generated by scintillator detectors of claim 2 where the pulse-processing unit performs many weighting summations in parallel.

5. The apparatus for compensating for pulse shape variation of light generated by scintillator detectors of claim 2 wherein the scintillator detector utilizes a crystal comprising of a europium-doped alkaline earth halide, selected from the group consisting of SrI2(Eu), BaI2(Eu) or mixtures thereof.

6. The apparatus for compensating for pulse shape variation of light generated by scintillator detectors of claim 2 wherein the scintillator detector utilizes a plastic scintillator containing 2,5-diphenyl oxazole (PPO) as the primary scintillating materials and diphenyl anthracene (DPA) as the wavelength shifter to match the emission light wavelengths to the photomultiplier tube sensitivity.

7. The apparatus for compensating for pulse shape variation of light generated by scintillator detectors of claim 2 wherein the scintillator detector utilizes a phoswich from the class of a combination of ZnS(Ag) and a plastic scintillator, a combination of NaI(Tl) and CsI(Tl), a combination of NaI(Tl) and a plastic scintillator.

8. The apparatus for compensating for pulse shape variation of light generated by scintillator detectors of claim 2 wherein the scintillator detector utilizes an elpasolite crystal such as Cs2LiLaBr:Ce (CLLB) Cs2LiLaBr6:Ce (CLLB), Cs2LiYCl6:Ce (CLYC), Cs2LiLaCl6:Ce (CLLC).

9. The apparatus for compensating for pulse shape variation of light generated by scintillator detectors of claim 2 wherein the scintillator detector utilizes a crystal comprising activated cesium iodide.

10. The apparatus for compensating for pulse shape variation of light generated by scintillator detectors of claim 2 wherein the scintillator detector utilizes a crystal larger than 13 cubic centimeters.

11. The apparatus for compensating for pulse shape variation of light generated by scintillator detectors of claim 2 wherein the computational unit is a computer.

12. The apparatus for compensating for pulse shape variation of light generated by scintillator detectors of claim 2 wherein the computational unit is a microcontroller.

13. The apparatus for compensating for pulse shape variation of light generated by scintillator detectors of claim 2 wherein the computational unit is a field programmable gate array or an applications-specific-integrated-circuit ASIC.

14. The apparatus for compensating for pulse shape variation of light generated by scintillator detectors of claim 2 wherein the pulse processing unit and the computational unit perform the method step of claim 1 of processing the digital electrical pulses to provide a measure of the energy y_e[n] received in the scintillator.

15. The apparatus for compensating for pulse shape variation of light generated by scintillator detectors of claim 2 wherein the weighting coefficients w[n] are computed as a function of the crystal (detector) temperature.

16. The apparatus for compensating for pulse shape variation of light generated by scintillator detectors of claim 2 where the method is used to distinguish between different types of radiation.

\* \* \* \* \*